INVENTOR.
RAJAT DHANDA
BY Charles W. Gregg
AGENT

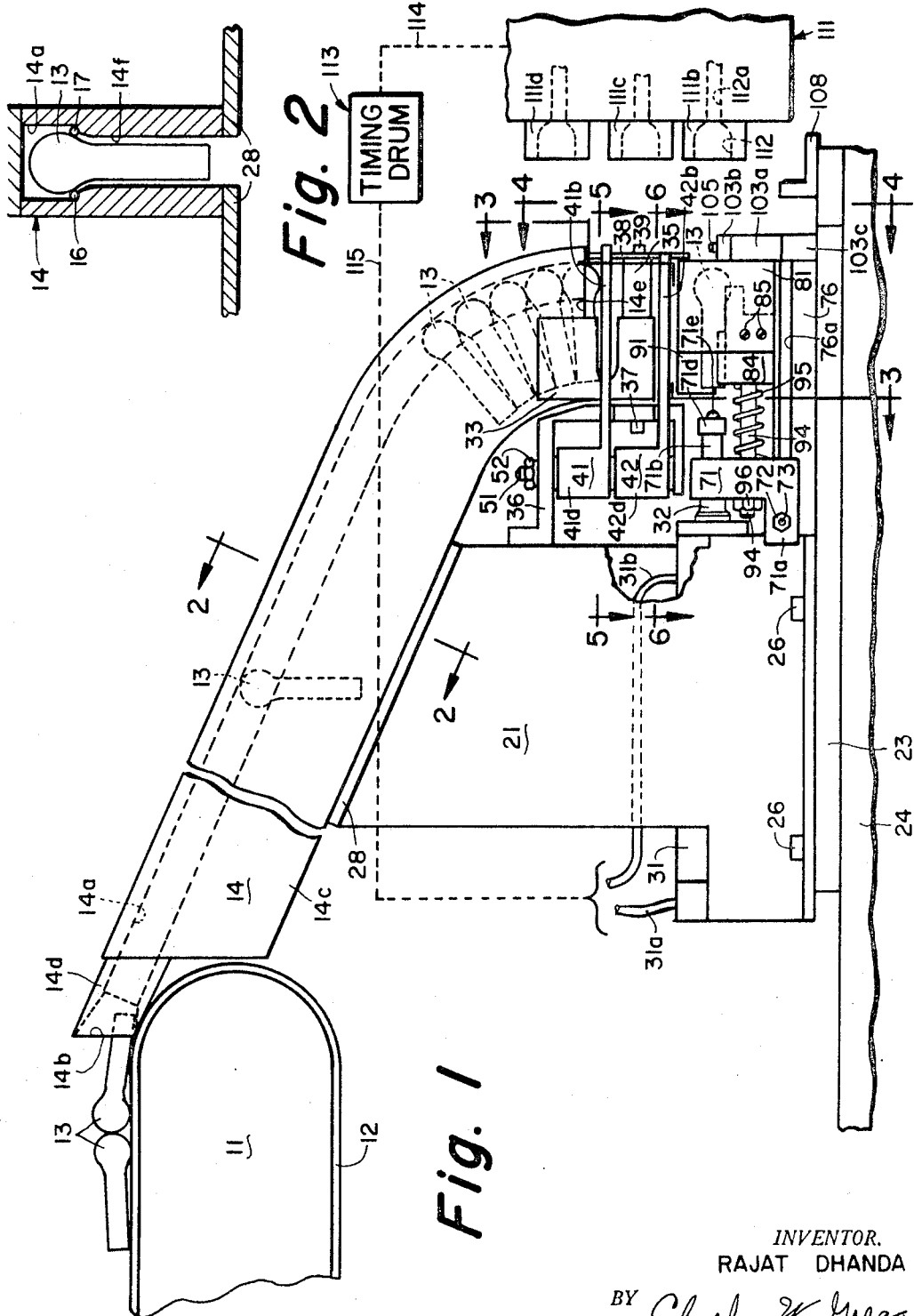

Sept. 16, 1969 R. DHANDA 3,467,236
WORKPIECE HANDLING APPARATUS
Filed July 14, 1967 4 Sheets-Sheet 4
Fig. 7
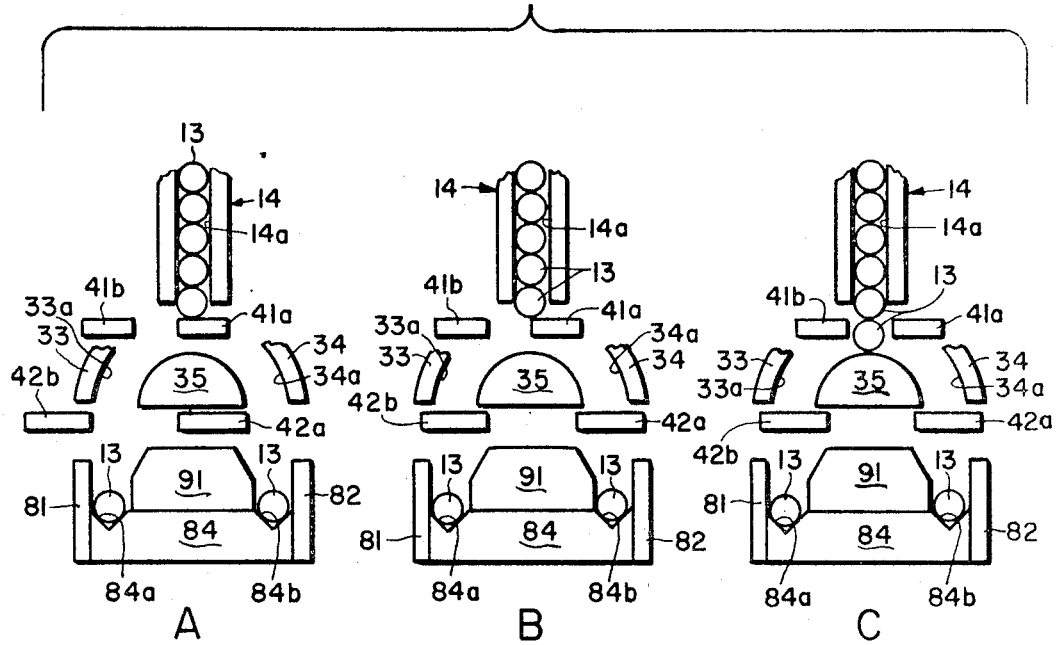
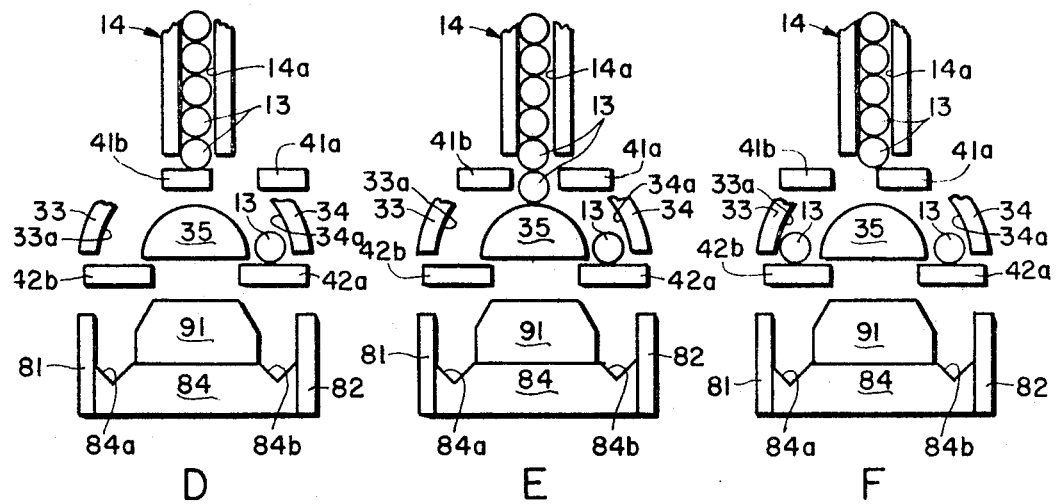
INVENTOR.
RAJAT DHANDA
BY Charles W. Gregg
AGENT United States Patent Office 3,467,236
Patented Sept. 16, 1969

3,467,236
WORKPIECE HANDLING APPARATUS
Rajat Dhanda, Corning, N.Y., assignor to Corning Glass Works, Corning, N.Y., a corporation of New York
Filed July 14, 1967, Ser. No. 653,533
Int. Cl. B65g 47/24, 59/06
U.S. Cl. 198—33    4 Claims

ABSTRACT OF THE DISCLOSURE

Apparatus for handling workpieces such as tubings, pipes or rods having a bulbar portion and a tubular or cylindrical stem portion, such apparatus receiving a collinear succession of workpieces having a random end-to-end orientation relative to each other, identically orienting such workpieces, and simultaneously and horizontally supplying such workpieces in pairs to horizontally disposed workpiece supports presented to a loading station in pairs by a machine which is to perform work on the workpieces.

BACKGROUND OF THE INVENTION

The field of art to which the invention pertains is the article handling field and, more specifically, to workpiece handling apparatus. More particularly, the present invention relates to apparatus for conveying and orienting workpieces, and feeding the oriented workpieces in pairs to a machine for operations or work to be performed on such workpieces. Still more specifically, the invention relates to apparatus for conveying and positioning in pairs and in a desired orientation each of a series of workpieces comprising a collinear, end-to-end succession of substantially identical lengths of pipe, rod or tubing having one bulbar end and one tubular or cylindrical stem end, and feeding each pair of such lengths of pipe, rod or tubing in said desired orientation to a machine for work to be performed on each respective workpiece. For example, for purposes of performing work or operations on workpieces by a machine it is oftentimes necessary that the workpieces be supplied or fed to the machine in a selected orientation so that workpiece supports, such as vacuum chucks, on the machine can hold the workpieces in the proper position for the performance of said operations or work thereon. When a machine receiving said workpieces operates at a relatively slow rate of speed, the supply or feeding of the workpieces to the machine can oftentimes be conveniently performed by hand. However, in a machine such as that mentioned but which operates at a relatively high rate of speed it is sometimes impractical or impossible to feed workpieces thereto by hand. Furthermore, for obvious economic reasons, it is oftentimes desirable that automatic apparatus be provided for orienting and feeding workpieces to a machine rather than manually supplying the workpieces thereto. For example, in one type of machine such as that mentioned, a succession of chucks on the machine are successively presented in pairs at a relatively high rate of speed to a machine loading station for receipt on or in each said chuck of each said pair of chucks of the bulbar end of one of a plurality of lengths of pipe, rod or tubing each having one such end, and a tubular or cylindrical stem end on which operations are to be performed, by tools associated with the machine, at a station or stations located subsequent to said loading station. When said lengths of pipe, rod or tubing are metal, for example, it may be desired that the tubular or cylindrical ends of such workpieces be ground or polished and said machine may then present a series of pairs of vacuum chucks to said loading station for receipt in each such chuck of the bulbar end of each of such workpieces. When such workpieces are plastic tubings, for example, such operations may comprise the flaring of the open tubular end of each of the tubings carried by said chucks. In any event, it is apparent that such lengths of pipe, rod or tubing must be supplied in pairs to a machine loading station and in a selected position. That is, pairs of the lengths of pipe, rod or tubing must be supplied to a machine loading station with their bulbar ends presented to the pairs of workpiece supports, such as vacuum chucks, carried by the respective machine.

SUMMARY OF THE INVENTION

In practicing the invention, there is provided an apparatus including a sloping chute having an entrance end for sequentially receiving the leading end of each one of a moving collinear and end-to-end succession of workpieces such as lengths of pipe, rod or tubing each having a bulbar end and a tubular or cylindrical stem end, each such successive workpiece following the preceding one with bulbar and stem ends of the workpieces arranged in random sequence relative to each other, said chute conveying said workpieces to a downwardly curved lower end of the chute which provides a horizontally disposed workpiece exit from which said workpieces are vertically issued with the longitudinal axes thereof horizontally disposed and with the bulbar end or portion of each workpiece oriented identically with each such end or portion of each of the other workpieces. First and second curving workpiece guide channels are provided below said chute, the upper ends of such channels converging below the chute and the lower ends of the channels being disposed above first and second workpiece support channels of a workpiece carrier from which the workpieces supplied thereto are simultaneously impelled in pairs to horizontally disposed workpiece supports sequentially presented by a machine, in pairs, to said workpiece carrier. First and second gating means control the issuance of said workpieces from said workpiece exit of said chute and alternately gate immediately successive workpieces to said first and second guide channels, respectively, and thence, simultaneously, to said first and second workpiece support channels in the workpiece carrier.

BRIEF DESCRIPTION OF THE DRAWINGS

In the drawings:

FIG. 1 comprises a side elevational view of one form of apparatus embodying the invention;

FIG. 2 is an enlarged cross-sectional view taken substantially along line 2—2 of FIG. 1;

FIG. 7 is a diagrammatic view schematically illustrating the operation of the apparatus of FIG. 1 embodying the invention.

Similar reference characters refer to similar parts in each of the figures of the drawings.

DESCRIPTION OF THE PREFERRED EMBODIMENT

Figure 3:
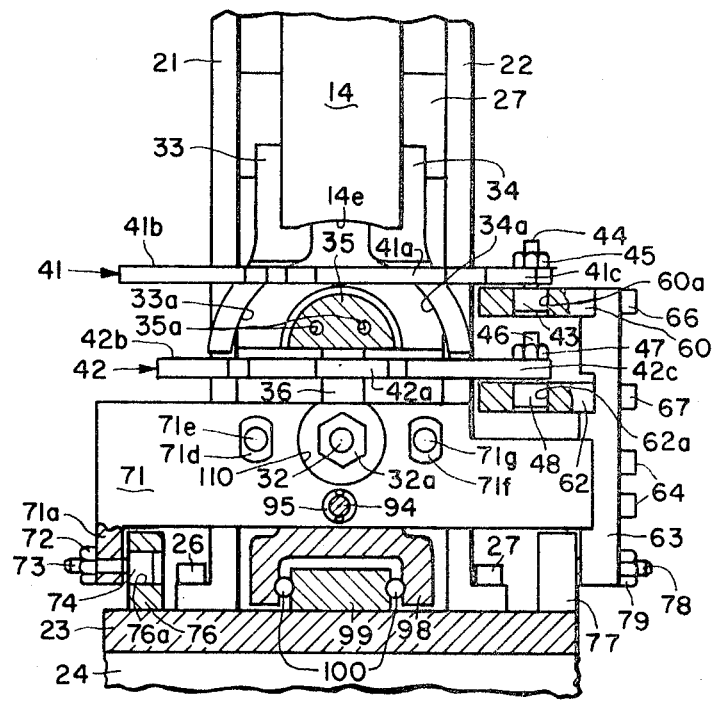
FIG. 3 is an enlarged cross-sectional view taken substantially along line 3—3 of FIG. 1 and with sections of parts broken away to show details of the apparatus.

Referring to FIG. 1 of the drawings, there is shown a conveyor belt 12 associated with a hopper designated generally as 11 and which may, for example, be supported on suitable legs mounted on a floor or platform 24. However, for purposes of simplification of the drawings, said legs are not shown therein. Belt 12 of hopper 11 conveys a continuous succession of longitudinally aligned workpieces each comprising a length of pipe, rod or tubing, such as 13, and each having bulbar portion or end, and a portion or end in the form of a cylindrical stem, each such stem portion being of a greater weight than each bulbar portion, that is, the center of gravity of each workpiece being below the bulbar portion or toward the stem portion of each respective workpiece. Such workpieces are supplied to a workpiece entrance 14b of a channel 14a in an upper first portion 14d of a sloping chute 14 to be hereinafter discussed. Hopper 11, per se, forms no part of the present invention but is a commercially available device such as, for example, a model 330 INM No-Mar Hopper, manufactured and sold by Industrial and Automation Products Division of Radio Corporation of America, the address of such division being 41225 Plymouth Road, Plymouth, Mich. Such hopper is illustrated and described in Catalog A–1050–R published by said division, and reference may be made to such catalog if more details of the hopper than those shown in FIG. 1 of the drawings are desired.

As shown in FIG. 1 and as mentioned above, said succession of workpieces, such as 13, being fed from conveyor belt 12 of previously mentioned hopper 11 are supplied to workpiece entrance 14b of channel 14a in portion 14d of chute 14 and each preceding workpiece is pushed into said workpiece entrance by the succeeding workpiece just behind each preceding workpiece. The portion of channel 14a in first portion 14d of chute 14 is circular in cross-section so that said workpieces slide longitudinally under the influence of gravity through such portion of channel 14a in portion 14d of the chute and thence into the portion of channel 14a in a second portion 14c of chute 14. The portion of channel 14a in such second portion of chute 14 embodies a bottom opening in the form of a longitudinal slot 14f as illustrated in FIG. 2 of the drawings. Such slot extends to a workpiece exit 14e (FIG. 1) in the end of channel 14a at the lower end of chute 14. As shown in FIG. 2, slot 14f has a width in excess of the diameter of the cylindrical stem portions or ends but less than the bulbar portions or ends of the workpieces such as 13. Therefore, as shown in FIGS. 1 and 2, as each workpiece slides downwardly through channel 14a in chute 14 and reaches that part of such channel in which slot 14f is provided, the stem of each workpiece falls into said slot in the bottom of channel 14a since, as previously mentioned, such stem is heavier, that is, is of a greater weight than the bulbar portion of the respective workpieces. Each such workpiece then continues to slide down channel 14a in chute 14 under the influence of gravity and in an orientation best shown in FIG. 2 but also illustrated in FIG. 1. In order to minimize the frictional resistance to the sliding movement of the workpieces down channel 14a a pair of rails 16 and 17 (FIG. 2) of a circular cross-section are provided on opposite sides of channel 14a just above slot 14f provided in the bottom of the channel. Such rails may, for example, be made of stainless steel. As illustrated in FIG. 2, the bulbar portion of the workpieces just above the stems thereof ride on such rails.

The lower end of chute 14 and its embodied channel 14a, including the slot or slotted open bottom 14f of such channel, curve at the lower end of the chute so that the previously mentioned workpiece exit 14e of channel 14 is horizontally disposed. Thus, as illustrated in FIG. 1, as a succession of workpieces such as 13 approach said workpiece exit, each workpiece of such succession progressively declines so that its longitudinal axis is substantially horizontally disposed when, as hereinafter further discussed, it issues from workpiece exit 14e of channel 14a.

Chute 14 is secured to a plate 28 (FIGS. 1 and 2) mounted on the sloping upper edges of a pair of similar upright support members 21 (FIGS. 1 and 3 through 6) and 22 (FIGS. 3 through 6) having flanged lower ends which are secured, as by bolts 26 and 27, (FIGS. 1, 3, 5 and 6) to a base plate 23. Base plate 23 is in turn, mounted upon and secured to the previously mentioned floor or platform 24. A vertical support plate 27 (FIG. 3) extends between upright support members 21 and 22 and is secured to such members in any convenient manner, such as by welding, for example. A support bracket 36 having a reversed rectangular C shape is securely attached in any convenient manner, as by welding, to support plate 27. The purpose of support bracket 36 will be discussed in detail hereinafter.

A horiontal support plate 25 (FIGS. 5 and 6) is disposed between upright support members 21 and 22 near the bottom of such members and is also secured to such members in any convenient manner, such as by welding. A reciprocative motor 31 is mounted on the top surface of horizontal support plate 25 (FIGS. 1, 5 and 6) and is securely fastened thereto by suitable clamping devices (not shown) or by welding if found expedient to do so. Motor 31 is preferably a pressurized fluid actuated motor including a cylinder, as shown in the drawings, and embodying the usual piston to which is attached a piston rod 32 extending out of the right-hand end of the cylinder (viewing FIGS. 1, 5 and 6). Pressurized fluid conduits 31a and 31b are connected to opposite ends of the cylinder or motor 31 for supplying pressurized fluid thereto for reciprocative actuation of the piston therein and its associated piston rod 32. This will be discussed in more detail hereinafter.

On the right-hand side of FIG. 1 there is shown, at a loading station, a first vacuum chuck 111b which is one of a series of such chucks carried on a vertically disposed turret 111 and evenly spaced about such turret adjacent the outer periphery thereof. Chuck 111b is one of an adjacent pair of said series of chucks, the other chuck of such pair also being at said loading station but not appearing in FIG. 1 of the drawing since, in such drawing figure, it is hidden by chuck 111b. A second adjacent pair 111c and 111d of said series of chucks carried by turret 111 is also shown, such pair of chucks being the next pair to be indexed to said loading station as hereinafter discussed. Each chuck such as 111b is provided with a pocket, such as 112, for receipt of the bulbar portion of one of the workpieces, such as 13. A conduit, such as 112a, connects with each said pocket, such as 112, to supply vacuum or negative aeriform fluid pressure to the respective pocket. The bulbar portions of said workpieces are securely held, by such vacuum, in the pockets of the respective chucks to which the respective workpieces are supplied as discussed hereinafter in an operational example of the present invention.

The aforementioned and briefly described apparatus such as turret 111 and its associated vacuum chucks form, per se, no part of the present invention but are parts of another machine with which the apparatus of the present invention can be conveniently employed. Such parts are, therefore, shown and discussed only to the extent necessary for the purpose of giving one specific example of a machine with which the apparatus of the present invention may be usefully employed. Such machine may, for example, be a machine for grinding and polishing the stems of the workpieces such as 13.

There is also shown in FIG. 1, in block form, a timing drum 113 which, as indicated by the dotted line 114 extending between such drum and turret 111, controls the indexing of such turret so that the pairs of chucks, such as 111c and 111d, carried by the turret are periodically presented, in pairs, to said loading station. Timing drum 113, per se, also forms no part of the present invention except, as indicated by the dotted line 115 extending between such timing drum and fluid conduits 31a and 31b connected to fluid motor 31, the timing drum selectively controls the supply of pressurized fluid to said conduits and thence to said motor for actuation of the piston of such motor in a time relationship with the indexing or presentation of the pairs of chucks on turret 111 to said loading station. Such time relationship will be discussed in more detail hereinafter in the operational example of the present invention. However, it is believed expedient to point out at this point in the description that timing drums such as 113 are old and very well known in the art and such drum may, for example, be similar to the sequential valve actuator shown and described in Letters Patent of the United States 2,871,882, issued Feb. 3, 1959, to I. Eliasson.

Figure 4:
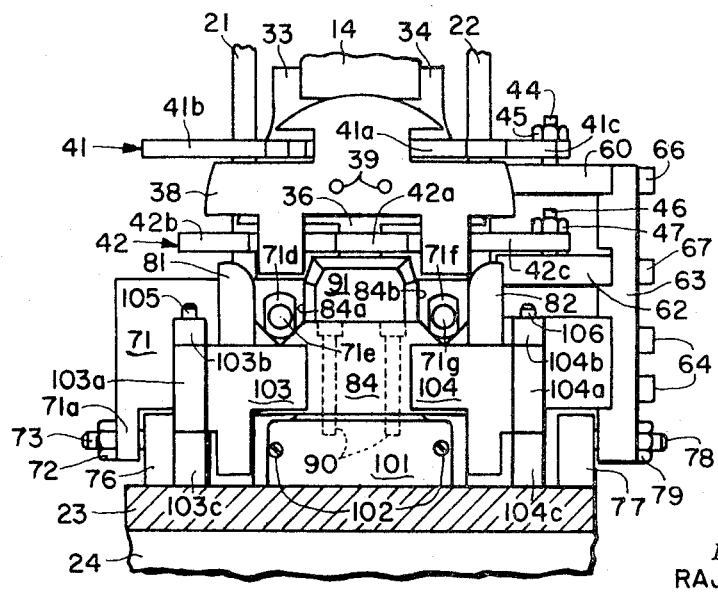
FIG. 4 is an enlarged end elevational view of part of the apparatus of FIG. 1 and taken substantially along line 4—4 of FIG. 1.

Referring to FIGS. 1 and 4, there is shown a stepped workpiece carrier 84 to the ends of which are secured, as by screws such as 85, a pair of upright members 81 and 82. There is also secured to the center of the top surface of workpiece carrier 84, in any convenient manner, a center block member 91. A pair of V-shaped grooves or channels are provided in the top surface of carrier 84, and said upright members 81 and 82, said center block 91, and said V grooves or channels provide support channels 84a and 84b (FIG. 4) for receipt and support of a pair of workpieces, such as 13, as illustrated in FIG. 1. The centers of workpiece support channels 84a and 84b are spaced apart a distance equal to the spacing between the centers of each of the pairs of workpiece receiving chucks, such as chucks 111c and 111d on turret 111, presented to the previously mentioned loading station. Previously mentioned base plate 23 is located and carrier 84 is, as discussed below, movably supported thereon at said loading station so that the longitudinal axis of each of a pair of workpieces such as 13 supported in said V grooves are aligned with the center of a corresponding one of a pair of said chucks presented to such loading station.

Carrier 84 is movably supported by a carriage device comprising a fixed guide member 99 (FIG. 3) secured in any convenient manner to previously mentioned base plate 23, a channel member 98 disposed over guide member 99 so that such member is disposed in the channel of member 98, and a plurality of ball bearings such as 100 disposed in races provided in and between guide and channel members 99 and 98 so that such channel member may be readily moved along the sides of guide member 99. Such types of carriage devices are well known in the art. Workpiece carrier 84 and its associated parts are securely fastened to the top surface of channel member 98 by a pair of bolts 90 (FIG. 4) extending through the carrier and screwed into cooperatively threaded holes provided in such channel member. An end plate 101 (FIG. 4) is fastened to the end of channel member 98 by a pair of screws 102 extending through the plate and into cooperatively threaded holes provided in the end of such channel member. An adjustable L-shaped stop or bumper 108 (FIGS. 1, 5 and 6) is secured to the right-hand end of base plate 23 by screws 109 extending through slotted holes in such bumper and screwed into cooperatively threaded holes provided in such base plate. By such arrangement it is readily apparent that workpiece carrier 84 and its associated parts, and channel member 98 of said carriage, may be moved in unison in the right-hand direction from the position of carrier 84 shown in FIG. 1, considered the normal position of the carrier, until said end plate 101 on said channel member 98 contacts or strikes bumper 108. Workpiece carrier 84 and its associated parts, and said channel member 98 may, of course, be returned in unison in the left-hand direction (viewing FIG. 1) to said normal position of carrier 84 shown in FIG. 1.

A pair of spaced-apart rails or bars 76 and 77 (FIGS. 1 and 3 through 6) are securely fastened to the top surface of base plate 23 in any convenient manner and provide a track for guiding a wheeled carriage 71. The left-hand end of carriage 71 (viewing FIGS. 3 and 4) has an extending portion 71a through which extends an axle 73 which rotatably carries a wheel or roller 74 (FIG. 3) which is disposed in and is movable along a slot 76a extending along part of the length of rail 76 (FIGS. 1 and 3). Axle 73 is fastened in said portion 71a of carriage 71 by a nut 72 screwed onto cooperative threads provided on the outer end of the axle. There is fastened to the right-hand side of carriage 71 (viewing FIGS. 3 and 4) an upright cam support 63, such support being fastened to the carriage by a pair of bolts such as 64 extending through the support and screwed into cooperative threads provided in said side of carriage 71. The lower rear end of support 63 is provided, similarly to said extending portion 71a of carriage 71, with an axle 78 extending through said support and fastened to said lower end thereof by a nut 79. Axle 78 rotatably carries on its inner end a wheel or roller similar to wheel or roller 74 and which is disposed in a slot in rail 77 similar to slot 76a provided in rail 76. For purposes of simplification of the drawings, the wheel or roller carried by axle 78, and the slot in rail 77 in which such roller or wheel is disposed and is movable along are not shown in the drawings. However, it will be readily apparent from the above description and to those skilled in the art that the arrangement is similar to that shown in FIG. 3 for roller or wheel 74 disposed in slot 76a.

The otherwise free end of piston rod 32 of fluid motor 31 extends through wheeled carriage 71 and such parts are securely fastened to each other by a nut 32a (FIG. 3) screwed onto cooperating threads provided on said end of piston rod 32. The tightening of nut 32a onto the end of piston rod 32 results in such nut being fully disposed in a recess 110 provided in the face of carriage 71 and, therefore, such nut appears only in FIG. 3 of the drawings. Wheeled carriage 71 is resiliently connected to workpiece carrier 84 (FIG. 1) by a rod 94 secured to carrier 84 in any convenient manner. Such rod snugly but slidably extends through a hole provided through carriage 71 and a nut 96 is screwed onto cooperative threads provided on the end of rod 94 extending through said carriage. A compressible coil spring 95 surrounds that portion of rod 94 extending between carriage 71 and carrier 84, such spring being normally somewhat compressed to normally maintain such parts separated a distance limited by the distance nut 96 is screwed onto the end of rod 94. By the arrangement of carriage 71, rod 94 and workpiece carrier 84 just described, it is readily apparent that reciprocative movement of piston rod 32 causes corresponding and similar movement of carriage 71, and of carrier 84 and its associated parts, the wheels or rollers of carriage 71 moving along the previously-mentioned slots in rails 76 and 77 at such time.

A pair of workpiece impellers are secured to the face of wheeled carriage 71, such impellers comprising cylindrical main portions 71a and 71b (FIGS. 1, 5 and 6) on the free ends of which are disposed caps 71f and 71d, respectively, which carry workpiece contact buttons 71g and 71e, respectively. The centers of such buttons are horizontally separated a distance equal to the distance between the centerlines of the V channels in workpiece carrier 84 and the impellers are mounted on said face of carriage 71 so that the center of button 71e is in alignment with the longitudinal axis of any workpiece, such as 13, supported in channel 84a in carrier 84 while the center of button 71g is in alignment with the longitudinal axis of any workpiece, such as 13, supported in channel 84b in carrier 84.

A pair of upright pivot pins or axles 105 and 106 is firmly secured in holes in base plate 23 and pivotally supports swinging gates 103 and 104, respectively, with the pins or axles extending through hub portions 103a and 104a of gates 103 and 104, respectively. A collar 103b is secured on axle 105 above the hub portion 103a of gate 103 and the lower end of hub portion 103a rests on a base portion 103c of pivot pin 105. Similarly, a collar 104b is secured on axle 106 above the hub portion 104a of gate 104, and the lower end of hub portion 104a rests on a base portion 104c of pivot pin 106. Suitable coil springs, not shown in the drawings for purposes of simplification thereof, are provided in base portions 103c and 104c and contact gates 103 and 104, respectively. Such springs normally bias such gates to the positions shown in the drawing. When, as hereinafter further discussed, such gates are opened or swung outwardly (the right-hand direction viewing FIGS. 1, 5 and 6 of the drawings) said springs are progressively further wound and, upon removal of the forces causing the gates to swing open, the increased tension of the springs, caused by the winding thereof during the opening of the gates, causes the closing of the gates or return thereof to their normal positions shown in the drawings. Spring biased gates such as that shown are old and well-known devices.

Chute 14 is secured to plate 28 (FIG. 1) mounted on the upper edges of upright support members 21 and 22 so that the centerline of workpiece exit 14e of channel 14a in the chute is in alignment with the centerline of previously mentioned workpiece carrier 84 and so that the workpieces which are issued from said workpiece exit 14e, as hereinafter discussed, are supplied to the workpiece support channels of carrier 84 as illustrated in FIG. 1. First and second workpiece guide devices 33 and 34 are (viewing FIGS. 3 and 4) secured to the left and right-hand sides, respectively, of chute 14 adjacent the lower end thereof. The rear or, viewing FIG. 1, the left-hand end of a third and longitudinal workpiece guide device 35 is securely fastened by bolts such as 37 (FIG. 1) to the previously mentioned support bracket 36. Such guide device is shown as a reclined longitudinal semicylindrical block having two diameters. That is, the front portion of the block (viewing FIG. 3) is of a smaller diameter than the rear portion thereof by which the block or device is secured to said bracket 36. The purpose in the two portions of the block having different diameters is, of course, because of the shape of the workpieces such as 13 and will be readily apparent to those skilled in the art.

Figure 5:
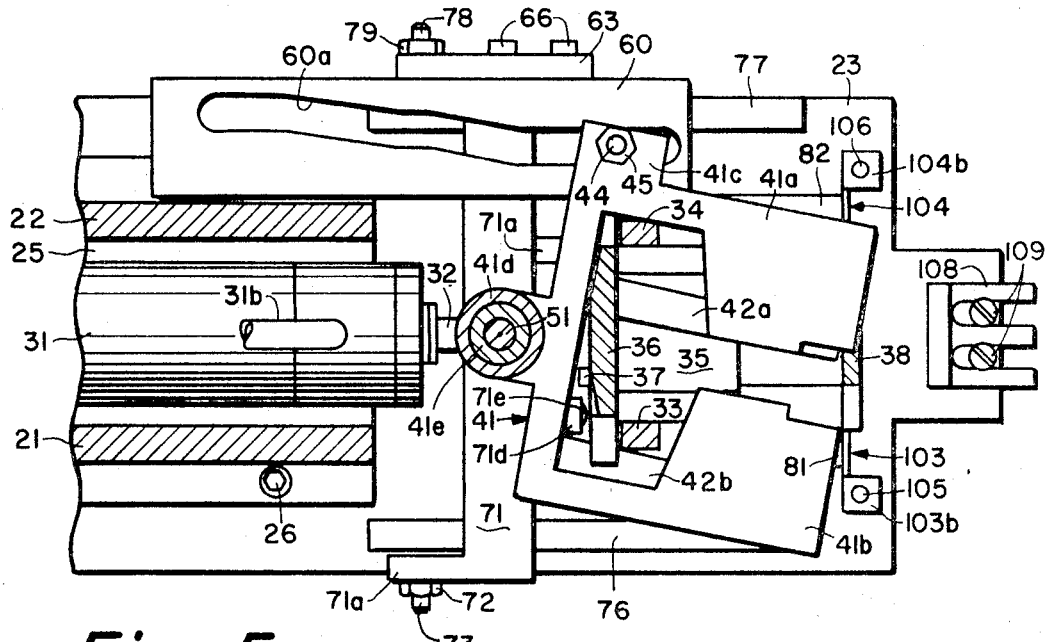
FIGS. 5 and 6 comprise enlarged sectional plan views of parts of the apparatus of FIG. 1 taken substantially along lines 5—5 and 6—6, respectively, of FIG. 1.
Figure 6:
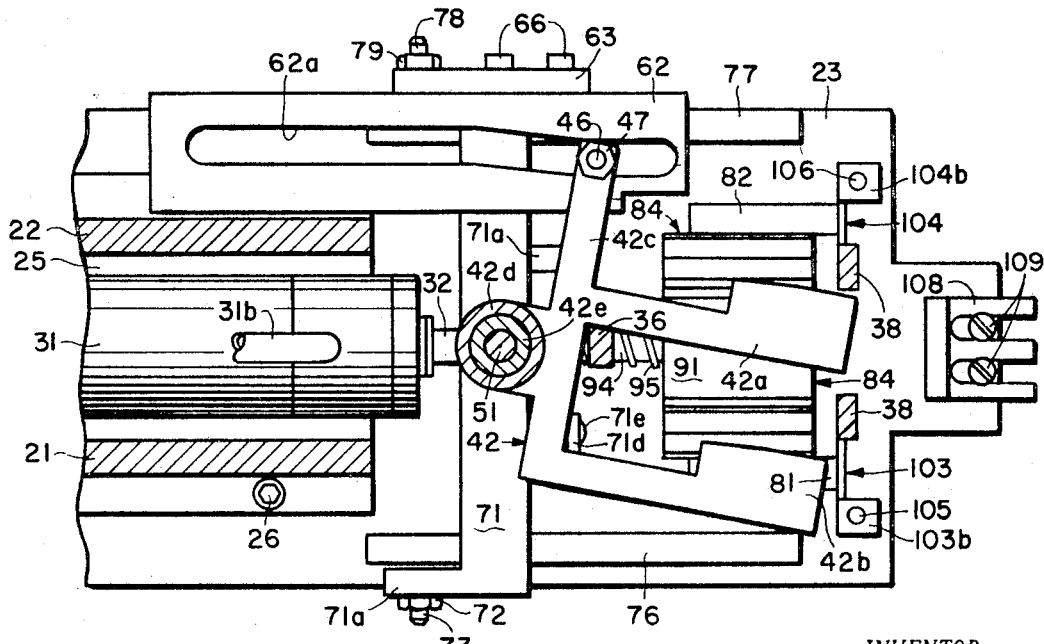

Guide device or block 35 is secured to bracket 36 so that the longitudinal apex or summit thereof is in alignment with the longitudinal centerline of workpiece exit 14e of channel 14a in chute 14. There is attached to the right-hand end (viewing FIG. 1) of guide device 35 a workpiece deflection plate 38 (FIG. 4) such plate being so attached by a pair of bolts 39 screwed into cooperating threads in holes such as 35a (FIG. 3) provided in such right-hand end of the guide device or guide block 35. Deflection plate 38 assures that the workpieces, such as 13, issuing from chute 14 do not tend to creep out of the front end of the apparatus. (The right-hand end of such apparatus when viewing FIG. 1.) Deflection plate 38 is provided with a plurality of slotted portions providing openings or slots into which parts of the apparatus either normally intrude or do so during operation of the apparatus. Such normal intrusion of such parts is illustrated in FIGS. 5 and 6 of the drawings. Workpiece guide devices 33, 34 and 35 in conjunction with deflection plate 38 provide a pair of workpiece guide channels 33a and 34a (FIG. 3) whose upper ends converge and connect with workpiece exit 14e of channel 14a in chute 14, such workpiece guide channels diverging below said exit so that the lower ends thereof are disposed above previously-mentioned workpiece support channels 84a and 84b of carrier 84, respectively.

As best illustrated in FIGS. 1 and 5, a first gating means 41 is pivotally carried on a pivot pin or axle 51 extending through the top arm of support bracket 36 and secured to the bottom arm thereof. Such gating means includes first and second extending fingers or workpiece contacting portions 41a and 41b (FIG. 5), a laterally extending actuating tab portion 41c and a hub portion 41d, such hub embodying a bushing 41e through which said axle or pivot pin 51 snugly but rotatably extends. A pivot pin or axle 44 extends through said actuating tab portion 41c and is secured thereto by a nut 45. A roller or cam follower 43 (FIG. 3) is rotatably carried on the lower end of pivot pin 44 adjacent the lower surface of said tab portion and rides in a slot or cam track 60a of a cam 60 which is securely fastened to the previously-mentioned upright support 63 by a pair of bolts 66 extending through said support and screwed into cooperative threads provided in cam 60 (FIGS. 3, 4 and 5). In the normal condition of the apparatus workpiece contacting portion or finger 41a of gating means 41 is positioned, as shown in FIGS. 3 and 5, so that the end portion of such finger is substantially disposed below workpiece exit 14e of channel 14a in chute 14. The purpose and operation of gating means 41 will be discussed in detail hereinafter in an operational example of the invention.

As illustrated in FIGS. 1 and 6, a second gating means 42 is also pivotally carried on pivot pin or axle 51 below gating means 41. Such second gating means includes first and second extending fingers or workpiece contacting portions 42a and 42b (FIG. 6), a laterally extending actuating tab portion 42c and a hub portion 42d, such hub embodying a bushing 42e through which axle or pivot pin 51 snugly but rotatably extends. A pivot pin or axle 46 extends through said actuating tab portion 42c and is secured thereto by a nut 47. A roller or cam follower 48 (FIG. 3) is rotatably carried on the lower end of pivot pin 46 adjacent the lower surface of tab portion 42c and rides in a slot or cam track 62a of a cam 62 which is securely fastened to upright support 63 by a pair of bolts such as 67 extending through said support and screwed into cooperative threads provided in cam 62 (FIGS. 3 and 4). In the normal condition of the apparatus the workpiece contacting portions or fingers 42a and 42b are positioned, as shown in FIGS. 3, 4 and 6, so that the end portions thereof are disposed to the left (viewing FIG. 3) of the lower ends of workpiece guide channels 33a and 34a, respectively, that is, as shown in FIG. 4, to the left of the upper ends of workpiece support channels 84a and 84b of workpiece carrier 84. The purpose and operation of gating means 42 will also be discussed in detail hereinafter in an operational example of the invention.

Having thus described the structure of the apparatus of the invention, an operational example will be given. However, it is expedient to first point out that when carriage 71 is actuated by piston rod 32 of motor 31 in the right-hand direction (viewing FIG. 1) workpiece carrier 84, upright support 63 and cams 60 and 62 are similarly actuated. During such actuation of cams 60 and 62, cam followers 43 and 48 follow cam tracks 60a and 62a, respectively, and gating means 41 and 42 are actuated as hereinafter described. During the return of carriage 71 to its normal position shown in FIG. 1, said parts are, of course, correspondingly oppositely actuated to return such parts to their normal positions shown in the drawings.

Prior to start-up of the apparatus a succession of at least five workpieces such as 13 are manually disposed, as illustrated in FIG. 1, adjacent workpiece exit 14e of channel 14a in chute 14 in order that subsequent workpieces sliding down channel 14 will suitably and progressively decline to a substantially horizontally disposed orientation adjacent said workpiece exit. The necessity for this will be readily apparent to those skilled in the art. However, thereafter, hopper 11 is activated so that conveyor belt 12 supplies workpieces to chute 14 at a sufficient rate of speed to maintain a continuous succession of the workpieces in chute 14 and, as long as a succession of at least five workpieces are disposed adjacent said workpiece exit 14e, the apparatus of the invention can be put into operation, after a temporary shutdown thereof, without said manual feeding of workpieces thereto. This is, of course, obvious.

It will now be assumed that said succession of five or more workpieces have been supplied to chute 14, hopper 11 has been activated to continuously supply a succession of additional workpieces to chute 14 and that timing drum 113 has been started to cause turret 111 to be periodically indexed and present, in pairs, to the loading station the workpiece supports or vacuum chucks carried on such turret. Following such an indexing of turret 111 and the presentation of a pair of chucks such as 111c and 111d to the loading station, timing drum 113 supplies pressurized fluid to conduit 31a connected to the left-hand end (viewing FIG. 1) of motor 31, and piston rod 32 of the motor moves in the right-hand direction to actuate carriage 71, and the previously-discussed apparatus connected therewith, in a corresponding direction, as also previously discussed. The operation of the apparatus will best be understood with reference to the diagrammatic view of FIG. 7 of the drawings which show stages A through F illustrating schematically the operation of the apparatus in feeding workpieces in pairs to a pair of vacuum chucks presented to said loading station by turret 111 as discussed above.

Referring to stage A in FIG. 7, a pair of workpieces, such as 13, are shown supported in workpiece support channels 84a and 84b at the loading station in preparation for their being supplied to a pair of workpiece supports or vacuum chucks presented to the loading station. A continuous succession of such workpieces are also in channel 14a of chute 14 in preparation for being individually issued therefrom. Stage A therefore illustrates the positions of parts of the apparatus and the workpieces when the apparatus is in its normal position shown in FIG. 1.

During a first part of the movement of carriage 71 and the associated apparatus in the right-hand direction (viewing FIG. 1), fingers 42a and 42b of gating means 32 are moved beneath workpiece guide channels 33a and 34a, respectively, and fingers 41a and 41b of gating means 41 move to the right, as shown in stage B of FIG. 7, in preparation for permitting the workpiece then at the workpiece exit of channel 14a in chute 14 to drop between fingers 41a and 41b. During such first part of said movement, the pair of workpieces in workpiece support channels 84a and 84b are, of course, carried by workpiece carrier 84 toward the pair of vacuum chucks then presented to said loading station by turret 111 (FIG. 1).

Stage C, of FIG. 7, illustrates the position of parts of the apparatus when carriage 71 has completed approximately half its movement in supplying the pair of workpieces on carrier 84 to said pair of vacuum chucks. The workpiece previously at said workpiece exit of channel 14a has now dropped between fingers 41a and 41b and rests on the summit or apex of workpiece guide device 35.

As illustrated in stage D, during the last half of said movement of carriage 71, finger 41b pushes the workpiece previously between fingers 41a and 41b into workpiece guide channel 34a, such workpiece then resting on finger 42a of gating means 42. Also during such movement, workpiece carrier 84 contacts stop or bumper 108 (FIG. 1) and further movement of such carrier is terminated. However, carriage 71 further compresses spring 94 at such time and continues its movement so that the workpiece contact buttons 71e and 71g on the ends of impellers 71b and 71a, respectively, contact the ends of the workpieces then in workpiece support channels 84a and 84b, respectively, and impel such workpieces so that the bulbar ends or portions thereof enter into the pockets in the pair of vacuum chucks then presented to the loading station. It will be noted that, in stage D of FIG. 7, the workpieces previously in said channels 84a and 84b are no longer shown therein since they have been supplied to said pair of vacuum chucks. It will also be noted that the workpiece then at said workpiece exit of channel 14a now rests on the upper surface of finger 41b of gating means 41.

Following the completion of the movements of the apparatus in supplying or loading a pair of workpieces to a pair of vacuum chucks presented to the loading station, timing drum 113 connects conduit 31a to a suitable fluid sink, or to atmosphere if the pressurized fluid supplied to motor 31 is compressed air for example. Simultaneously therewith, timing drum 113 supplies pressurized fluid to conduit 31b and motor 31 is thereby energized to actuate piston rod 32 of the motor to return carriage 71 and the associated parts to their normal positions. It is pointed out that the points in time at which pressurized fluid is supplied to conduits 31a or 31b, or at which conduits are connected to a fluid sink or to atmosphere, are dependent sorely upon the speed of operation of timing drum 113 which is adjusted in accordance with the speed at which turret 111 can be operated and perform the operations which such turret or machine is intended to perform on the workpieces supplied thereto. Motor 31 is, therefore, selected so as to be able to operate the apparatus of the present invention at a speed commensurate with the timing cycles of timing drum 113.

Stage E of FIG. 7 illustrates the positions of parts of the apparatus when carriage 71 and the associated parts are approximately at the half-way point in their return movement to their normal positions. It will be noted that finger 41b of gating means 41 has moved from under the workpiece then at the workpiece exit of channel 14a in chute 14 and such workpiece has dropped in between that finger and finger 41a to rest on the summit or apex of workpiece guide device 35.

When carriage 71 has moved through approximately three quarters of its return movement, finger 41a has pushed the workpiece, previously resting between that finger and finger 41b, into workpiece guide channel 33a as illustrated in stage F of FIG. 7, and such workpiece then rests upon the top surface of finger 42b of gating means 42. During the last quarter of the return movement of carriage 71 to its normal position, fingers 42a and 42b of gating means 42 again move to the positions illustrated in stage A to permit the workpieces resting on the top surfaces thereof to drop into workpiece support channels 84a and 84b on carrier 84 in preparation for the feeding or supplying of such workpieces to the next pair of workpiece supports or vacuum chucks presented by turret 111 to the loading station. At the same time, fingers 41a and 41b also move to the positions thereof illustrated in stage A and the apparatus is, therefore, in its normal position and prepared for another cycle of operations such as just described.

The previously mentioned gates 103 and 104 prevent workpieces, such as 13, from sliding out of workpiece support channnels 84a and 84b in workpiece carrier 84 during the supplying of such workpieces to said channels and when such carrier is in its normal position shown in FIG. 1. However, during the movement of workpiece carrier 84 in the right-hand direction (viewing FIG. 1) gates 103 and 104 are pushed open by the previously mentioned upright members 81 and 82 attached to carrier 84 and, therefore, such gates do not interfere with the subsequent impelling of the workpieces in channels 84a and 84b to the workpiece supports presented by turret 111 to the loading station. The previously mentioned springs associated with gates 103 and 104 return such gates to their closed positions when carrier 84 and its associated upright members 81 and 82 return to their normal positions shown in FIG. 1 of the drawings.

It is pointed out that, with minor modifications of the workpiece feeding or supplying apparatus, it can be used to feed or supply workpieces such as lengths of pipe, rod or tubing, of a uniform diameter throughout their lengths, to a machine for operations to be performed on such workpieces. For example, a vertical chute supplying a succession of such workpieces with the longitudinal axes thereof horizontally disposed can be substituted for chute 14 and the fingers of the gating means and the workpiece support channels in carrier 84 can be modified in minor ways to accommodate such workpieces for supplying thereof in pairs to suitable workpiece supports presented in pairs by a machine to the loading station. Therefore, although there is herein shown and described in detail only one form of apparatus embodying the invention, it will be understood that such is not intended to be in any way limiting but that various changes and modifications may be made therein.

What is claimed is:

1. An apparatus for use in conjunction with a machine carrying a series of horizontally oriented workpiece supports which are successively presented by the machine in pairs to a loading station for the receipt, simultaneously, by each support of each of the pairs of supports so presented, of a different workpiece of each of a succession of pairs of workpieces, each such workpiece comprising a tubing, rod or the like having a bulbar portion and a cylindrical stem portion, such stem portion being of a length such that the center of gravity of the tubing is toward its stem portion; said apparatus successively and identically delivering in pairs to said loading station a succession of said workpieces and impelling from the apparatus, simultaneously and in a horizontal orientation, each workpiece of each pair delivered to the loading station, and said apparatus operating in a time relationship with the speed of presentation of said workpiece supports to said loading station such that each said pair of workpieces may be impelled upon their delivery to the loading station to a pair of such workpiece supports then presented to such station; said apparatus comprising, in combination;

(A) a sloping chute for receiving workpieces of the class mentioned above and embodying;
  (a) a workpiece entrance at the upper end of the chute for receipt of said workpieces,
  (b) a channel for sliding conveyance of said workpieces under the influence of gravity, such channel including a bottom opening in the form of a longitudinal slot having a length at least as long as each of said workpieces and having a width exceeding the diameter of the stem portions but less than the bulbar portions of said workpieces, and
  (c) a lower end curving downwardly to provide a horizontally disposed workpiece exit for vertical emission of each said workpiece in a longitudinally horizontal orientation, such workpiece exit being disposed above said loading station;
(B) means for supplying to said workpiece entrance a collinear succession of said workpieces, such succession of workpieces having a random end-to-end orientation relative to each other;
(C) a workpiece carrier at said loading station and having a pair of workpiece support channels for horizontally supporting a pair of said workpieces with the longitudinal axes thereof spaced apart a distance corresponding to the spacing between said workpiece supports carried by said machine,
(D) a pair of workpiece impellers aligned with said workpiece support channels in said workpiece carrier and linearly actuable to impel workpieces supported in such channels to said pairs of workpiece supports presented by said machine to said loading station;
(E) workpiece guide devices adjacent said workpiece exit and above said workpiece carrier, such devices providing first and second workpiece guide channels leading to first and second ones, respectively, of said pair of workpiece support channels in said carrier,
(F) first gating means between said workpiece exit and said workpiece guide channels, such means actuable to gate successive ones of said workpieces alternately to said first and second workpiece guide channels;
(G) second gating means between the lower end of said workpiece guide channels and said workpiece carrier, such means actuable to gate workpieces previously gated to said first and second workpiece guide channels to said first and second ones, respectively, of said pair of workpiece support channels in said carrier; and
(H) means reciprocatively driving said apparatus between first and second positions, including actuation of said impellers and said gating means, in said time relationship such that, during each said movement from said first to said second positions, each preceding pair of workpieces previously gated to said workpiece support channels in said carrier are impelled to the pair of workpiece supports next presented by said machine to said loading station and the workpiece then at said workpiece exit is gated to one of said workpiece guide channels, during a first part of each said movement from said second to said first positions, the workpiece then at said workpiece exit is gated to the other of said workpiece guide channels and, during a second part of the last-mentioned movement, the workpieces then in said workpiece guide channels are simultaneously gated to said workpiece support channels in said carrier in sufficient time to be impelled, during the next driven movement of said apparatus from said first to said second positions, to the next immediately succeeding pair of workpiece supports presented by said machine to said loading station.

2. Apparatus in accordance with claim 1 and in which said reciprocatively driving means comprises a pressurized fluid piston motor driven in said time relationship, and in which said gating means includes a linearly actuable cam and associated cam follower for each said gating means, the piston of said motor being connected to said impellers and said cams for said actuation of such impellers and such gating means.

3. Apparatus for use in conjunction with a machine carrying a series of horizontally oriented workpiece supports which are successively presented by the machine in pairs to a loading station for the receipt, simultaneously, by each support of each of the pairs of supports so presented, of a different workpiece of each of a succession of pairs of workpieces, each such workpiece comprising a tubing, pipe, rod or the like, said apparatus successively and identically delivering in pairs to said loading station a succession of said workpieces and impelling from the apparatus, simultaneously and in a horizontal orientation, each workpiece of each pair delivered to the loading station, and said apparatus operating in a time relationship with the speed of presentation of said workpiece supports to said loading station such that each said pair of workpieces may be impelled upon their delivery to the loading station to a pair of such workpiece supports then presented to such station, said apparatus comprising, in combination;

(A) a workpiece carrier at said loading station and having workpiece support channels for horizontally supporting a pair of said workpieces with the longitudinal axes thereof spaced apart a distance corresponding to the spacing between said pairs of workpiece supports presented by said machine to said loading station,
(B) a pair of workpiece impellers aligned with said workpiece support channels in said workpiece carrier and linearly actuable to impel workpieces supported in such channels to said workpiece supports carried by said machine;
(C) a chute embodying a workpiece conceying channel having a workpiece exit disposed above said loading station at a point laterally equally intermediate said workpiece support channels in said workpiece carrier, such exit being aligned so as to issue said workpieces therefrom with their longitudinal axes parallel with such workpiece support channels in said carrier;
(D) first, second and third workpiece guide devices disposed above said workpiece support channels in said carrier and adjacent said workpiece exit of said channel in said chute, said first and third workpiece guide devices providing a first workpiece guide channel leading from said workpiece exit toward one of said workpiece support channels in said carrier, said second and third workpiece guide devices providing a second workpiece guide channel leading from said workpiece exit toward the other of said workpiece support channels in said carrier, and said workpiece guide channels merging with each other below said workpiece exit, said third workpiece guide device having a longitudinal summit longitudinally aligned and directly beneath the longitudinal centerline of said workpiece exit and bisymmetrically sloping uniformly downwardly and laterally from said summit toward said workpiece guide channels;

(E) first gating means including first and second fingers spaced apart a distance at least equal to the maximum diameter of said workpieces and extending between said workpiece exit and said workpiece guide channels, such gating means actuable to laterally and alternately move said first and second fingers to and from beneath said workpiece exit;

(F) second gating means including first and second extending fingers normally disposed beneath the lower ends of said first and second workpiece guide channels, respectively, such gating means actuable to move said fingers laterally and simultaneously from and to beneath said lower ends of said workpiece guide channels;

(G) actuating means for each said gating means, each such actuating means including a movable cam and associated cam follower attached to the respectively associated gating means; and (H) motor means for reciprocatively driving said impellers and said actuating means for said gating means, such motor means comprising a pressurized fluid motor including a piston reciprocatively movable between first and second positions and connected to said impellers and said cams, such motor being energized in said time relationship such that, (a) during each said movement of said piston from said first to said second position, the piston actuates said impellers to impel each preceding pair of workpieces previously gated to said workpiece support channels in said carrier to the pair of workpiece supports next presented by said machine to said loading station, and actuates said first gating means and its associated fingers to gate the workpiece then at said workpiece exit to one of said workpiece guide channels.

(b) during a first part of each said movement of said piston from said second to said first positions, the piston actuates said first gating means and its associated fingers to gate the workpiece then at said workpiece exit to the other of said workpiece guide channels, and, (c) during a second part of each said movement of said piston from said second to said first positions, the piston actuates said second gating means and its associated fingers to simultaneously gate to said workpiece support channels in said carrier, in sufficient time to be impelled to the next immediately succeeding pair of workpiece supports presented by said machine to said loading station and during the next movement of the piston from said first to said second positions, the workpieces then in said workpiece guide channels.

4. An apparatus for use in conjunction with a machine carrying a series of horizontally oriented workpiece supports which are successively presented by the machine in pairs to a loading station for the receipt, simultaneously, by each support of each of the pairs of supports so presented, of a different workpiece of each of a succession of pairs of workpieces, each such workpiece comprising a tubing, rod or the like having a bulbar portion and a cylindrical stem portion, such stem portion being of a length such that the center of gravity of the tubing is toward its stem portion; said apparatus successively and identically delivering in pairs to said loading station a succession of said workpieces and impelling from the apparatus, simultaneously and in a horizontal orientation, each workpiece of each pair delivered to the loading station, and said apparatus operating in a time relationship with the speed of presentation of said workpiece supports to said loading station such that each said pair of workpieces may be impelled upon their delivery to the loading station to a pair of such workpiece supports then presented to such station; said apparatus comprising, in combination;

(A) a sloping chute embodying a channel for sliding conveyance of said tubings under the influence of gravity and including, (a) a workpiece entrance at the upper end of the channel, (b) a workpiece exit at the lower end of the channel, and (c) a bottom opening in the form of a longitudinal slot having a length at least as long as each of said workpieces and extending to said workpiece exit of the channel, the width of such slot being in excess of the diameter of said stem portions of the workpieces but less than the bulbar portions thereof, and (d) the lower end of said chute and its embodied channel curving downwardly so that said exit end of the channel is horizontally oriented and said workpieces issue vertically therefrom with their longitudinal axes in a substantially horizontal orientation;

(B) a workpiece carrier at said loading station and having workpiece support channels for horizontally supporting a pair of said workpieces with the longitudinal axes thereof spaced apart a distance corresponding to the spacing between said pairs of workpiece supports presented by said machine to said loading station, (C) a pair of workpiece impellers aligned with the workpiece support channels in said workpiece carrier and linearly actuable to impel workpieces supported in such channels to said workpiece supports carried by said machine;

(D) means supporting said chute and its conveying channel with said workpiece exit disposed above said loading station at a point laterally equally intermediate said workpiece support channels in said workpiece carrier, such exit being aligned so as to issue said workpieces therefrom with their longitudinal axes parallel with such workpiece support channels in said carrier;

(E) first, second and third workpiece guide devices disposed above said workpiece carrier and adjacent said workpiece exit of said channel in said chute, said first and third workpiece guide devices providing a first workpiece guide channel leading from said workpiece exit toward one of said workpiece support channels in said carrier, said second and third workpiece guide devices providing a second workpiece guide channel leading from said workpiece exit toward the other of said workpiece support channels in said carrier and said workpiece guide channels merging with each other below said workpiece exit, said third workpiece guide device having a longitudinal summit longitudinally aligned and directly beneath the longitudinal centerline of said workpiece exit and bisymmetrically sloping uniformly and laterally downwardly from said summit toward said workpiece guide channels;

(F) first gating means including first and second fingers spaced apart a distance at least equal to the maximum diameter of said workpieces and extending between said workpiece exit and said first and second workpiece guide channels, respectively, such gating means actuable to laterally and alternately move said first and second fingers to and from beneath said workpiece exit;

(G) second gating means including first and second extending fingers normally disposed beneath the lower ends of said first and second workpiece guide channels, respectively, such gating means actuable to move said fingers laterally and simultaneously from and to beneath said lower ends of said workpiece guide channels;

(H) actuating means for each said gating means, each such actuating means including a movable cam and associated cam follower attached to the respectively associated gating means; and (I) motor means for reciprocatively driving said impellers and said actuating means for said gating means, such motor means comprising a pressurized fluid motor including a piston reciprocatively movable between first and second positions and connected to said impellers and said cams, such motor being energized in said time relationship such that, (a) during each said movement of said piston from said first to said second positions, the piston actuates said impellers to impel each preceding pair of workpieces previously gated to said workpiece support channels in said carrier to the pair of workpiece supports next presented by said machine to said loading station, and actuates said first gating means and its associated fingers to gate the workpiece means then at said workpiece exit to the other of said workpiece guide channels, and, (b) during a first part of each said movement of said piston from said second to said first positions, the piston actuates said first gating means and its associated fingers to gate the workpiece then at said workpiece exit to the other of said workpiece guide channels, and, (c) during a second part of each said movement of said piston from said second to said first positions, the piston actuates said second gating means and its associated fingers to simultaneously gate to said workpiece support channels in said carrier, in sufficient time to be impelled to the next immediately succeeding pair of workpiece supports presented by said machine to said loading station and during the next movement of the piston from said first to said second positions, the workpieces then in said workpiece guide channels.

References Cited

UNITED STATES PATENTS

| | | | |
|---|---|---|---|
| 2,427,712 | 9/1947 | Casler | 193—43 |
| 2,945,335 | 7/1960 | Nicholle. | |
| 3,080,092 | 3/1963 | Zdanis | 221—175 |

RICHARD E. AEGERTER, Primary Examiner

U.S. Cl. X.R.

221—292